Oct. 23, 1962 R. H. DUNCAN ET AL 3,060,265

CONFERENCE CALL CIRCUIT

Filed Jan. 26, 1960 2 Sheets-Sheet 1

Oct. 23, 1962 R. H. DUNCAN ET AL 3,060,265

CONFERENCE CALL CIRCUIT

Filed Jan. 26, 1960 2 Sheets-Sheet 2

United States Patent Office 3,060,265

Patented Oct. 23, 1962

3,060,265

CONFERENCE CALL CIRCUIT

Robert H. Duncan, Arlington Heights, Thomas Paul Miller, Mount Prospect, and Anthony V. Maciulis and Solly L. Fudaley, Chicago, Ill., assignors to International Telephone and Telegraph Corporation, New York, N.Y., a corporation of Maryland Filed Jan. 26, 1960, Ser. No. 4,709
22 Claims. (Cl. 179—1)

This invention relates to telephone systems and more particularly to conference call circuits for use in such systems.

Typical conference call circuits provide for matching the impedances of all interconnected circuits with provisions for equalizing the attenuation of signals by all stations and with provisions for negating signal attenuation caused by the introduction of an excess number of stations. However, conference call circuits have not met all of these requirements primarily because the characteristics of individual subscriber lines are not sufficiently uniform; and because the strength of the voice signal at a subscriber's receiver is a function of the number of stations connected to the conference call circuit, i.e., the characteristic impedance of the conference circuit is lowered as stations are connected thereto and raised as stations are removed therefrom. The result is that conference circuits which have been used in the past were unstable, and provided inefficient power transfer, improper sidetone and combinations thereof.

An object of this invention is to provide new and improved conference call circuits.

A further object of this invention is to provide conference call circuits which may simultaneously serve either a large number or a small number of stations, as required.

Another object of this invention is to provide conference call circuits wherein each receiver and transmitter is terminated by its own characteristic impedance.

Still another object of this invention is to provide telephone systems having controlled sidetone.

Yet another object of this invention is to provide conference call circuits that require no adjustment of signal amplitude as stations are added to or dropped from the conference.

Another object of this invention is to minimize instability in conference call circuits.

In accordance with this invention, a conference call circuit is provided with transmit and receive channels which are common to all conversing subscribers and which are interconnected by a high gain link amplifier that compensates for any attenuation. Each subscriber line which may be connected into the conference circuit is provided with individual transmit and receive channels each containing a device for individually isolating the transmitter and the receiver from the common channel, thereby preventing changes in the characteristic impedance of the common channel which might otherwise be caused when stations are added to or dropped from a conference call. The individual transmit channel and the individual receive channel of each subscriber line are interconnected so that signals originating in such individual transmit channel are inverted and fed back into the individual receive channel associated therewith to control sidetone at the associated subscriber station.

The above mentioned and other objects of this invention together with the manner of obtaining them will become more apparent and the invention itself will be best understood by making reference to the following description of a preferred embodiment of the invention taken in conjunction with the accompanying drawings, in which:

FIG. 1 is a block diagram which shows a portion of a conference call circuit; and FIG. 2 shows the details of the circuit which may be used to complete the hollow blocks of FIG. 1.

Where possible, simple terms are used and specific items are described hereinafter to facilitate an understanding of the invention; however, it should be understood that the use of such terms and references to such items are not to act in any manner as a disclaimer of the full range of equivalents which is normally given by established rules of patent law. To illustrate, the attached drawings show transistorized amplifiers; however, any suitable amplifying and isolating means such as vacuum tubes may be used. Still further the amplifiers are shown as two-stage amplifiers; whereas, any combination of stages that results in a proper signal phase shift may be utilized. Although only three subscriber lines are shown, any suitable number may be interconnected via the conference circuit. Quite obviously other examples could be selected to illustrate the manner in which specific terms that have been used and items have been described are entitled to a wide range of equivalents.

*Brief Description*

Turning now to FIG. 1, a conference call circuit is shown in block diagram form. Each of the three subscriber stations A, B and N has an individual transmit and receive channel. For example, subscriber station A has a transmitter 1, an isolation transmitter amplifier 2, a receiver 5, and an isolation receiver amplifier 4. A first output of the transmitter amplifier 2 is connected to a first input of the receiver amplifier 4 by way of an individual circuit branch such as sidetone control circuit 3, so that a sample of all signals originating in transmitter 1 may be inverted and fed back into receiver amplifier 4 to control the sidetone. Another output terminal on transmitter amplifier 2 is connected by any suitable means such as plugs and jacks or automatic switches at point 30 to a common channel or transmission line such as transmit bus 21 which is terminated by a characteristic impedance 25. Another input terminal on receiver amplifier 4 is similarly connected to a common channel or transmission line such as receive bus 22 which is also terminated by a characteristic impedance 26. The common transmit and receive channels are, in turn, interconnected by a link amplifier 11 which provides a uniform amplification of all voice signals originating in the conference call system.

It should be noted that the invention provides a telephone system wherein all subscriber lines terminate in the uniform impedance of an individually and permanently associated amplifier which is adjusted to compensate for loss on the associated line. While the attached drawings and this description speak only of conference call circuits, it should be understood that the principles of the invention may be used any time that a uniformity of line impedance is desired.

*Detailed Description*

Figure 2:
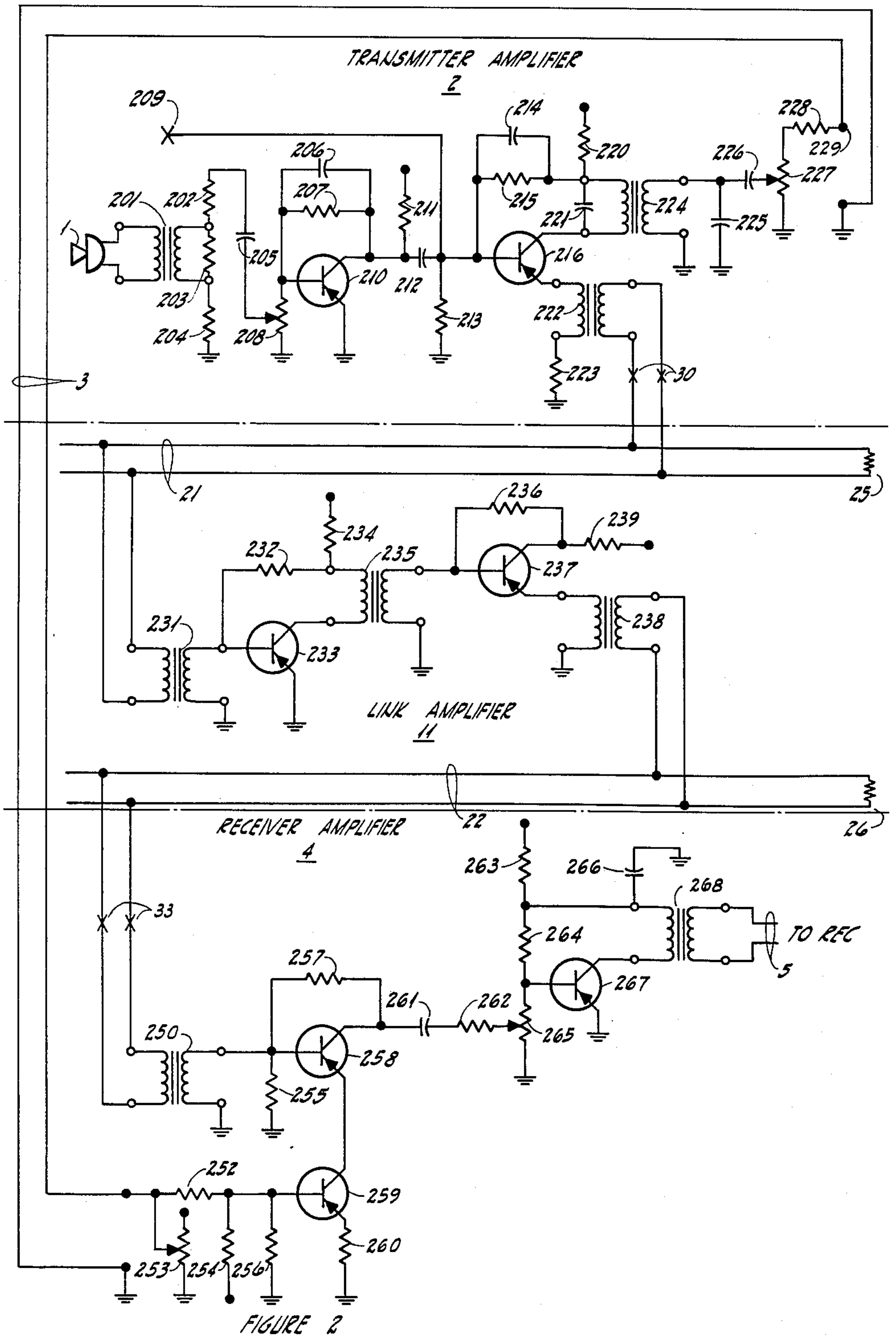

For a more complete understanding of the invention, reference is made to the detailed circuit individually associated with subscriber station A together with the common link equipment as shown in FIG. 2.

Figure 1:
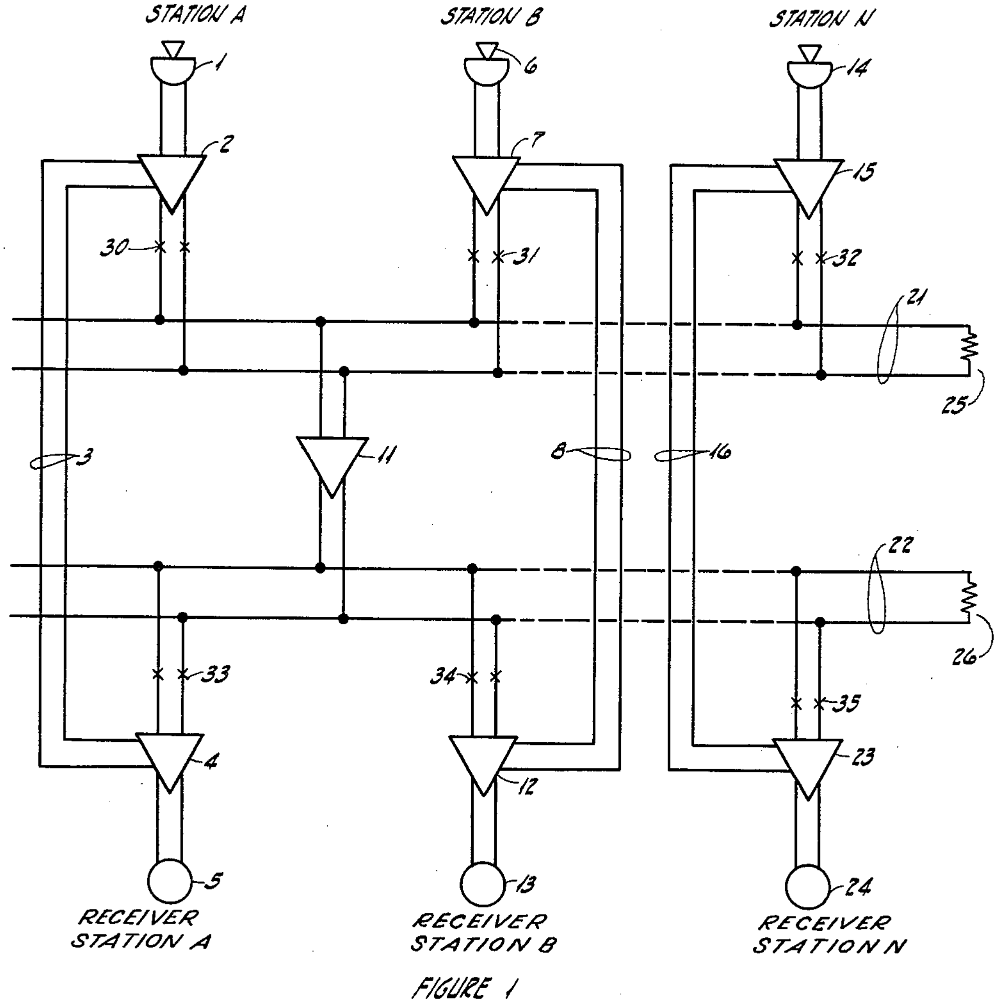

More particularly, FIG. 2 relates to FIG. 1 in the following manner. Transmitter 1 of subscriber station A is shown near the upper left-hand corner of FIG. 2, receiver 5 of subscriber station A is shown near the lower left-hand corner, isolation transmitter amplifier 2 is shown in the upper third, isolation receiver amplifier 4 is shown in the lower third, and sidetone control feedback circuit 3 is shown near the left-hand edge. The remainder of FIG. 2 is the common channel which serves all subscriber lines that participate in a conference call. It should be understood that the circuits which complete hollow boxes 7, 12, 15 and 23 are identical to those shown in FIG. 2 in connection with amplifiers 2 and 4.

Next, it is assumed that a party at station A is talking after a conference call has been set up.

*Transmitter amplifier*.—Means are provided for obtaining two output signals from transmitter amplifier 2, a first of such signals being used to provide the principal voice signal and a second of such signals being used to provide controlled sidetone. More particularly, transmitter 1 is connected to transmitter amplifier 2 through transformer 201 and a network comprising capacitor 205, resistors 202, 203 and 204, the purpose of which is to match the characteristic impedance of the transmitter. Signals from transmitter 1 are applied through transformer 201 and coupling capacitor 205 into variable resistor 208 and then to the base of transistor 210 where the signals are amplified. Capacitor 206 and resistor 207 along with resistor 211 make up the bias and by-pass circuits for transistor 210. The amplified signal from transistor 210 is applied via capacitor 212 to the base of transistor 216 which provides the two output signals.

The principal voice signal is obtained from the emitter of transistor 216 while the sidetone control signal is obtained from the collector thereof. The voice signal is extended to the common link of the conference circuit over a path that can be traced from the emitter of transistor 216 through the primary winding of transformer 222 and resistor 223 to ground. The output side of transformer 222 is connected via terminals 30 to the common transmit bus 21 which is terminated by a characteristic impedance 25. A high impedance is presented to bus 21 by amplifier 2 to allow a great number of transmitting stations to be interconnected without substantially altering the characteristic impedance of bus 21. The sidetone control signal travels over an individual circuit branch than can be traced from the collector of transistor 216 through transformer 224 (which is tuned by capacitors 221 and 225), coupling capacitor 226, potentiometer 227, and resistor 228 to sidetone control circuit 3 and a first input circuit of receiver amplifier 4. Potentiometer 227 is adjusted to cause the amplitude and phase of the sidetone control signal to be approximately 180° out of phase with the principal voice signal taken from the emitter of transistor 216.

It should be noted that the impedance of transmit bus 21 remains uniform regardless of the number of stations that are connected into the conference call circuit. More particularly, transmitter 1 always sees only its own characteristic impedance looking into transformer 201 while transmit bus 21 sees only an extremely high impedance which has little or no effect on its characteristic impedance when looking back into transmitter amplifier 2. Therefore, the number of transmit channels that are connected in the conference call circuit, does not effect the impedance of bus 21.

*Link amplifiers*.—Means are provided for uniformly amplifying all voice signals originating in the conference call circuit. That is, the signal on transmit bus 21 is applied to link amplifier 11 through transformer 231 and then applied to transistor 233 which is a grounded emitter type amplifier. Transistor 233 is properly biased from the power supply through resistor 234, resistor 232 and also through one side of transformer 235. Transformer 231 is used to match the impedance of link amplifier 11 to the characteristic impedance of transmit bus 21 whereby maximum power transfer is achieved.

After amplification in transistor 233, the voice signal is applied through transformer 235 to the base of transistor 237 where there is further amplification. Transistor 237 is properly biased from the power supply through resistors 239 and 236. The emitter of transistor 237 is connected to ground through a winding of transformer 238 which is used to match the impedance of link amplifier 11 to the characteristic impedance of receive bus 22 whereby maximum power transfer is achieved. Thus, it is seen that all voice signals are amplified by link amplifier 11 which is a high gain, two stage, transistorized amplifier that utilizes inductive coupling exclusively rather than capacitive coupling.

*Receiver amplifier*.—Means are provided in the form of receiver amplifier 4 for isolating the receive channels of individual subscriber stations and for providing controlled sidetone under the influence of signals received over conductors 3. In greater detail, the amplified voice signals appearing on receive bus 22 are applied through transformer 250 to the base of transistor 258 which is also biased to ground through resistor 255. Transformer 250 presents a high impedance to receive bus 22; therefore, the impedance of the bus is not materially affected by the addition or removal of stations to the conference circuit.

To control sidetone in receiver amplifier 4, the base of transistor 259 is directly coupled to transmitter amplifier 2 through resistor 252. The amplitude of the sidetone control signal appearing on conductors 3 can be adjusted by potentiometer 253. Resistors 254 and 256 form a voltage divider for applying a proper bias to the base of transistor 259. The emitter of transistor 259 is connected to ground through resistor 260. Both the voice signal applied through transformer 250 from receive bus 22, and the sidetone control signal received over conductors 3 are vectorially summed in the connection between the collector of transistor 259 and the emitter of transistor 258. As explained above, the signal appearing on conductors 3 is approximately 180° out of phase with that applied from receive bus 22 via transformer 250; therefore, the voice and sidetone control signals in combining buck and the talking subscriber at station A hears only a controlled amount of sidetone. Although, the potentiometers 227 and 253 could be adjusted to completely cancel all signals originating at transmitter 1, they are preferably adjusted to provide the sidetone which occurs during normal or non-conference calls.

To energize receiver 5, the vectorially summed signal appearing at the collector of transistor 258 is applied through coupling capacitor 261, resistor 262 and amplitude adjusting potentiometer 265 to the base of transistor 267. The base of transistor 267 is properly biased through a voltage divider including potentiometer 265 and resistors 264 and 263. The collector of transistor 267 is also biased from the B supply through resistor 263 and one winding of transformer 268. Capacitor 266 acts as a filter from the collector of transistor 267 to ground. The output signal from the collector of transistor 267 is applied through transformer 268 to receiver 5. Thus, it is seen that the receiver looking back into transformer 268 sees an impedance that matches its own impedance regardless of how many subscriber stations are conferenced in the circuit.

When a subscriber at a station other than station A is talking, no signal is received at receiver amplifier 4 over conductors 3 from individually associated transmitter amplifier 2; therefore, the only signal appearing at receiver 5 is that applied from receive bus 22, through transformer 250, transistor 258, transistor 267 and transformer 268. Since no sidetone control signal is received over conductors 3, there is no signal combining with the signal through transistor 259. Therefore, the signal driving receiver 5 when a subscriber at station B or N is talking is made up solely of the signal from receiving bus 22. The high impedance that receive bus 22 sees when looking into receiver amplifier 4 through transformer 250 results in no material alteration of the characteristic impedance of bus 22. Therefore, any reasonable number of receive channels can be interconnected in the conference circuit without creating instability.

The power transfer loss resulting from the lack of impedance matching between transmit bus 21 and transmitter amplifiers 2, 7 and 15; and between receive bus 22 and receiver amplifiers 4, 12 and 23 is compensated for by link amplifier 11. The power loss problem is not as serious as the instability problems that would result if there were no isolation amplifiers and the impedance of transmit bus 21 and of receive bus 22 were allowed to vary as a function of the number of stations that are connected thereto.

While the principles of the invention have been shown and described in connection with specific apparatus, it is to be clearly understood that this description is made only by way of example and not as a limitation on the scope of the invention.

What is claimed is:

1. A four wire conference call system comprising a plurality of subscriber stations, each having a transmitter and receiver associated therewith, first means associated with each of said stations for isolating the transmitter associated therewith, second means associated wtih each of said stations for isolating the receiver associated therewith, common amplifier means, means for selectively connecting said first and second means of any calling station through said common amplifier, means for selectively connecting said first and said second means of any desired called stations to said common amplifier for interconnecting each of said transmitters to all of said receivers, individual means for linking the isolating means associated with the same subscriber stations, and means including said last named means for automatically controlling sidetone responsive to actuations of said transmitter.

2. In a four wire conference call system, a plurality of subscriber stations, each comprising transmit means and related receive means, first isolating means individually associated with each of said transmit means, second isolating means individually associated with each of said receive means, separate means for interconnecting the transmit and related receive isolating means associated with the same subscriber station, first common bus means linking each of said transmit isolating means, second common bus means linking said receive isolating means, means including associated isolating means and common link means for selectively connecting any calling subscriber station with a desired number of called stations, and means associated with each of said isolating means responsive to signals imparted over said interconnecting means for controlling the amplitude of at least some of said signals in said related receive means.

3. The communication system of claim 2 wherein said isolating means associated with each of said transmit means comprises an amplifier, means within said amplifier for splitting signals appearing in said associated transmit means, and means for inverting a portion of said split signal.

4. In the communication system of claim 3 an impedance matching means for interconnecting each of said transmit means and the amplifier individually associated therewith whereby maximum power is transferred from said transmit means into an associated one of said amplifiers, means for applying a portion of said split signal to all of said isolating means that are associated with said receive means, and means for applying another portion of said split signal to the particular receive isolating means that is associated with the station at which said split signal originates.

5. The communication system of claim 2 wherein said isolating means associated with each of said transmit means comprises means for splitting said signals received from said associated transmit means, means for phase inverting a portion of said split signal, means for controlling the phase and amplitude of said inverted portion of said split signal, means for applying said controlled signal directly to the isolating means associated with the receive means of the station where said controlled signal originated, and means responsive to said last named means for controlling sidetone in said last named station.

6. In a communication system, a conference call circuit comprising a plurality of subscriber stations each having electrically isolated transmitter and receiver means associated therewith, means for interconnecting said isolated transmitters, means for interconnecting said isolated receivers, means for linking said interconnected transmitters and receivers thereby providing conferencing means, means individually associated with each of said stations for independently transferring signals from said isolated transmitter of said associated station to the isolated receiver of the same station, and means responsive to receipt of said independently transferred signals for controlling sidetone at said same station.

7. The conference call circuit of claim 6 wherein said linking means includes a multistage amplifier means, means for coupling said amplifier stages to provide a high gain and minimum distortion, and means also associated with said amplifier for matching impedances to maximize power transfer between said interconnected transmitters, said amplifier and said interconnected receivers.

8. A conference call circuit including a plurality of subscriber stations each having individually associated transmit and receive channels, a plurality of amplifiers, means for individually associating one of said amplifiers with each of said channels, each of said amplifiers associated with said transmit channels having one input and two outputs, each of said amplifiers associated with said receive channels having two inputs and one output, first means for connecting one of said outputs of each amplifier in said transmit channels to one of said inputs of the amplifier in an associated receive channel, second means including a common link for inter-coupling said other of said outputs of each amplifier in said transmit channels and the other of said inputs of each amplifier in said receive channels, and means for bucking signals supplied via said first and said second means for controlling sidetone at said subscriber stations.

9. The conference call circuit of claim 8 and means for controlling the gain of each of said channel amplifiers to compensate for losses in said individually associated channel, thereby providing substantial uniformity of signal strength regardless of the variations of loss in said channels.

10. The conference call circuit of claim 9, wherein said means for connecting one of said outputs of each of said amplifiers in said transmit channels to one of said inputs of each of said amplifiers in said receive channels comprises a common receive bus, a transmit bus, and means for coupling the transmit bus to said receive bus.

11. In the conference call circuit of claim 10, means including said amplifiers in said transmit channels for providing a constant terminating impedance to said transmit channel, and means including said amplifier in said receive channels for providing a constant driving impedance to said receive channel.

12. The conference call circuit of claim 8, wherein said said one output of each of said amplifiers of said transmit channels is phase inverted from said other output of each of said amplifiers of said transmit channels.

13. The conference call circuit of claim 8, wherein said means for bucking said signals comprises a pair of transistors each having at least control, input, and an output electrodes, means connecting said first means to said control electrode of one of said transistors, means for connecting said second means to the control electrode of the other of said transistors, means for interconnecting the output electrode of a first of said transistors and for connecting the input electrode of a second of said transistors, and means including said last named means for deriving a signal which is the vectorial sum of signals applied to said control electrodes.

14. A conference call system comprising a plurality of telephone stations each having a transmitter and a receiver, a transmission line, a plurality of high impedance circuits associated with each of said transmitters and receivers, means for selectively connecting the transmitter and receiver of any calling station through its associated high impedance circuits to said transmission line and for selectively connecting the receiver of any desired called station through its associated high impedance circuit to said line, means for transmitting signals with a first phase and first amplitude over said transmission line to the receivers of said calling and said called stations, individual circuit branches interconnecting the transmitter of each station with the receiver of such station, means for transmitting signals with a second amplitude and a second phase over the corresponding individual circuit branch to the receiver of said calling station, and means for producing a side-tone signal independent of the number of stations connected to said line by combining said signals of said first and second amplitudes and phases.

15. The system of claim 14 wherein said high impedance means comprises high impedance transformer circuits.

16. A four-wire conference call system comprising a plurality of telephone stations each having a transmitter and a receiver, means associated with each of said transmitters for producing signals with a first phase and a first amplitude and signals with a second phase and a second amplitude, a first transmission line common to each of said transmitters, a second transmission line common to each of said receivers, a plurality of high impedance circuits individually associated with each of said transmitters and receivers, means for selectively connecting the transmitter and receiver of any calling station through its associated high impedance circuits to said common transmission lines and for selectively connecting the receiver of any desired called station through its associated high impedance circuit to said second transmission line, amplifier means for connecting said first and second transmission lines for transmitting said signals with a first phase and a first amplitude from the calling station to the connected receivers, individual circuit branches directly interconnecting the transmitter of each station with the receiver of the same station for transmitting said signals with a second amplitude and a second phase from the transmitter of said calling station to the receiver of said calling station, and means for combining the signals of first and second amplitudes and phases to produce side-tone signals independent of the number of stations connected to said lines.

17. The system of claim 16 wherein said high impedance means comprises high impedance transformer circuits.

18. A conference call system comprising a plurality of telephone stations each having a transmitter and a receiver, a transmission line, a plurality of high impedance circuits individually associated with each of said transmitters and receivers, unidirectional first amplifier means permanently connected to each of said transmitters and a second unidirectional amplifier means permanently connected to each of said receivers, means for selectively connecting the transmitter and receiver of any calling station through its associated amplifiers and high impedance circuits to said transmission line and for selectively connecting the receiver of any desired called station through its associated amplifier and high impedance circuit to said line, means for transmitting signals with a first phase and first amplitude over said transmission line to the receivers of said calling and said called stations, individual circuit branches interconnecting the first amplifier associated with the transmitter of each station with the second amplifier associated with the receiver of such stations, means for transmitting signals with a second amplitude and a second phase over the corresponding individual circuit branch to the receiver of said calling station, means for transmitting voice communication through said system with an amplitude that is independent of the number of stations connected to said line and means for producing a side-tone signal by combining the signals of first and second amplitudes and phases, also independently of the number of stations connected to said line.

19. A four-wire conference call system comprising a plurality of telephone stations each having a transmitter and a receiver, a plurality of unidirectional amplifiers, transmitter impedance matching means in the input of said first amplifier, high impedance means at the output of said first amplifiers, means for connecting each of said transmitters respectively to the input of one of said first amplifiers, a plurality of second unidirectional amplifiers, high impedance means at the input of each of said second amplifiers, receiver impedance matching means at the output of said amplifiers, means for connecting each of said receivers respectively to one of said second amplifiers, a transmit channel common to the output of each of said first amplifiers, a receive channel common to the input of each of said second amplifiers, means for selectively connection the first amplifiers and second amplifiers of any calling station to said common transmit and receive channels and for selectively connecting the second amplifier of any desired called station through its associated second amplifier to said common receive channel, a high gain amplifier means for connecting said transmit channels to said common receive channel, means for transmitting signals of a first phase and a first amplitude from the calling station to the connected receivers, individual circuit branches directly interconnecting the first amplifier of each station with the second amplifier of the same station, means for transmitting signals of a second amplitude and second phase over the corresponding individual circuit branch, and means within said second amplifier for combining the signals of first and second amplitudes and phases to produce proper side-tone signals independently of the number of stations connected to said lines.

20. The system of claim 19 wherein each of the said first amplifiers comprises means for transmitting said signals received from the associated transmitter with the said first phase and first amplitude, and means for inverting the signals received from said transmitter and feeding said inverted signal to the associated receiver to provide signals of a second amplitude and a second phase.

21. The system of claim 19 wherein the means for combining the signals of first and second amplitudes and phases comprises a first and a second transistor in each of said second amplifiers, means for connecting said second transistor so that its output biases said first transistor, means responsive to the output of said first transistor for energizing the receiver connected to the amplifier, and means for applying the signals with a second amplitude and a second phase to the input of the second transistor to control the bias on said first transistor and thereby to control the output of the second amplifier and hence, the side-tone in the receiver connected thereto.

22. The conference call circuit of claim 19, wherein said means for combining said first and second signals comprises a pair of transistors each having at least control, input, and output electrodes, means for connecting the associated one of said individual circuit branches to said control electrode of one of said transistors, means for connecting said common receive channel to the control electrode of the one of said transistors and the input electrode of the other of said transistors, and means including said last named means for deriving a signal which is the vectorial sum of signals applied to said controlling electrodes whereby said derived signal provides the required side-tone.

References Cited in the file of this patent

UNITED STATES PATENTS

| | | |
|---|---|---|
| 2,205,142 | Hoard | June 18, 1940 |
| 2,282,403 | Herrick | May 12, 1942 |
| 2,282,404 | Herrick | May 12, 1942 |

FOREIGN PATENTS

| | | |
|---|---|---|
| 736,988 | Great Britain | Sept. 14, 1955 |